US006949910B2

(12) United States Patent
Chen

(10) Patent No.: US 6,949,910 B2
(45) Date of Patent: Sep. 27, 2005

(54) METHODS AND SYSTEMS FOR BATTERY CHARGING CONTROL BASED ON CMOS TECHNOLOGY

(75) Inventor: Chun-ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 141 days.

(21) Appl. No.: 10/694,188

(22) Filed: Oct. 28, 2003

(65) Prior Publication Data

US 2005/0088142 A1 Apr. 28, 2005

(51) Int. Cl.[7] ........................ H01M 10/44; H01M 10/46
(52) U.S. Cl. ........................................................ 320/125
(58) Field of Search ................................ 320/125, 136, 320/138, 160

(56) References Cited

U.S. PATENT DOCUMENTS 5,153,497 A * 10/1992 Eiden ......................... 320/102
5,666,040 A * 9/1997 Bourbeau ................... 320/118
6,252,378 B1 * 6/2001 Crass et al. ................. 320/132

* cited by examiner

*Primary Examiner*—Edward H. Tso
(74) *Attorney, Agent, or Firm*—Sterne, Kessler, Goldstein & Fox PLLC

(57) ABSTRACT

A method and system, compatible with low-voltage CMOS technology, for controlling the charging of a battery. The method includes monitoring a battery voltage with respect to a threshold voltage. The method further includes coupling a charging control logic supply to ground, generating an active low first control signal, inverting the active low first control signal, and charging the battery at a first rate when the battery voltage is below the threshold voltage. The method further includes coupling the charging control logic supply to the battery voltage, generating an active high second control signal, and charging the battery at a second rate when the battery voltage exceeds the threshold voltage. The first charging rate is slower than the second charging rate. The method further includes supplying battery power to a charger line when the battery voltage exceeds the charger voltage, and suppressing a leakage current.

20 Claims, 5 Drawing Sheets

100

METHODS AND SYSTEMS FOR BATTERY CHARGING CONTROL BASED ON CMOS TECHNOLOGY

BACKGROUND OF THE INVENTION

1. Field of the Invention

The present invention is related to battery charging circuits and, more particularly, to battery charging control circuits based on CMOS technology.

2. Related Art

Most portable electronics require batteries to supply power. When batteries are discharged to a low voltage level, chargers are required to charge the batteries to working condition. Li-Ion batteries need to be charged to about 4.2 V and NiMH/NiCd batteries need to be charged to about 5 V.

A battery charging control circuit controls the charging sequence to ensure that the charger safely charges the battery from a deeply discharged state to a fully charged state. There are at least two steps in the charging sequence, a slow charging mode and a fast charging mode. The battery charging control circuit initiates a charging mode according to the threshold voltage of the battery. For example, the threshold voltage of a Li-Ion battery is about 2.7 V. When the battery voltage is below the threshold voltage, the battery charging control circuit initiates the slow charging mode for safety. The slow charging mode current is about 40 mA. Because the voltage level is too low in this mode, the battery should not power external devices or the battery charging control circuit. The charger usually powers the battery charging control circuit in the slow charging mode. When the battery voltage is above the threshold voltage, the battery charging control circuit initiates the fast charging mode. The fast charging mode current is typically around 1 A. In this mode, the battery can power external devices and the battery charging control circuit.

A problem with this approach occurs if the battery charging control circuit is implemented with low-voltage CMOS technology. For example, the oxide breakdown voltage for 0.35 $\mu$m CMOS technology is typically 3.3 V. In the slow charging mode, the charger is the only available power source to power the charging control circuit, but the voltage level of the charger can go as high as 13 V, which is substantially higher than the breakdown tolerance of low-voltage CMOS technology. One solution to this problem is to add an external voltage regulator to step down the charger voltage to within the breakdown tolerance of the low-voltage CMOS technology. Another solution is to implement the charging control circuit with special high-voltage CMOS or other technologies. But the problem with these solutions is increased cost and power consumption.

What is needed are methods and systems for controlling the charging of a battery that are compatible with low-voltage CMOS technology.

SUMMARY OF THE INVENTION

The present invention is directed to methods and systems, compatible with relatively low-voltage CMOS technology, for controlling the charging of a battery. In an embodiment, a system for controlling the charging of a battery includes an external charging circuit and a charging control circuit, both coupled between a charger and a battery. The charger has at least two charging modes, a first charging mode that is slower than a second charging mode. The charging control circuit includes a monitor that compares a battery voltage to a threshold voltage and generates a battery status signal, which is received by a charging control logic and a power multiplexer. The charging control logic generates a first charging mode control signal and a second charging mode control signal, which are received by the external charging circuit.

When the battery status signal indicates the battery voltage is below the threshold voltage, the power multiplexer couples the charging control logic to ground, and the charging control logic generates an active low first charging mode control signal. An inverter coupled between the charging control circuit and the external charging circuit inverts the first charging mode control signal, which activates the first charging mode of the charger. When the battery status signal indicates the battery voltage exceeds the threshold voltage, the power multiplexer couples the charging control logic to the battery voltage, and the charging control logic generates an active high second charging mode control signal, which activates the second charging mode of the charger.

In an embodiment, the system for controlling the charging of a battery includes a diode coupled between the charger and the battery that enables the battery to supply power to the charger line when the battery voltage exceeds the charger voltage. In an embodiment, the external charging circuit includes a MOS device that prevents a leakage current from flowing into the charging control circuit.

In another embodiment, a method for controlling the charging of a battery includes monitoring a battery voltage with respect to a threshold voltage. The method further includes coupling a charging control logic supply to ground, generating an active low first control signal, inverting the active low first control signal, and charging the battery at a first rate when the battery voltage is below the threshold voltage. The method further includes coupling the charging control logic supply to the battery voltage, generating an active high second control signal, and charging the battery at a second rate when the battery voltage exceeds the threshold voltage. The first charging rate is slower than the second charging rate.

In an embodiment, the method for controlling the charging of a battery further includes supplying battery power to the charger line when the battery voltage exceeds the charger voltage. In an embodiment, the method further includes suppressing a leakage current.

Further features and advantages of the invention, as well as the structure and operation of various embodiments of the invention, are described in detail below with reference to accompanying drawings. It is noted that the invention is not limited to the specific embodiments described herein. Such embodiments are presented for illustrative purposes only. Additional embodiments will be apparent to persons skilled in the relevant arts based on the teachings contained herein.

BRIEF DESCRIPTION OF THE DRAWINGS/FIGURES

The present invention will be described with reference to the accompanying drawings. The drawing in which an element first appears is typically indicated by the leftmost digit(s) in the corresponding reference number.

DETAILED DESCRIPTION OF THE INVENTION

Overview

The present invention is directed to methods and systems for controlling the charging of a battery. In the detailed description that follows, an example environment in which the present invention can be used is identified and the preferred embodiments of the present invention are presented in detail. While specific features, configurations, and devices are discussed in detail, this description is for illustrative purposes, and persons skilled in the art will recognize that other configurations and devices can be used to achieve the features of the present invention without departing from the scope and spirit thereof.

Example Environment

Figure 1:
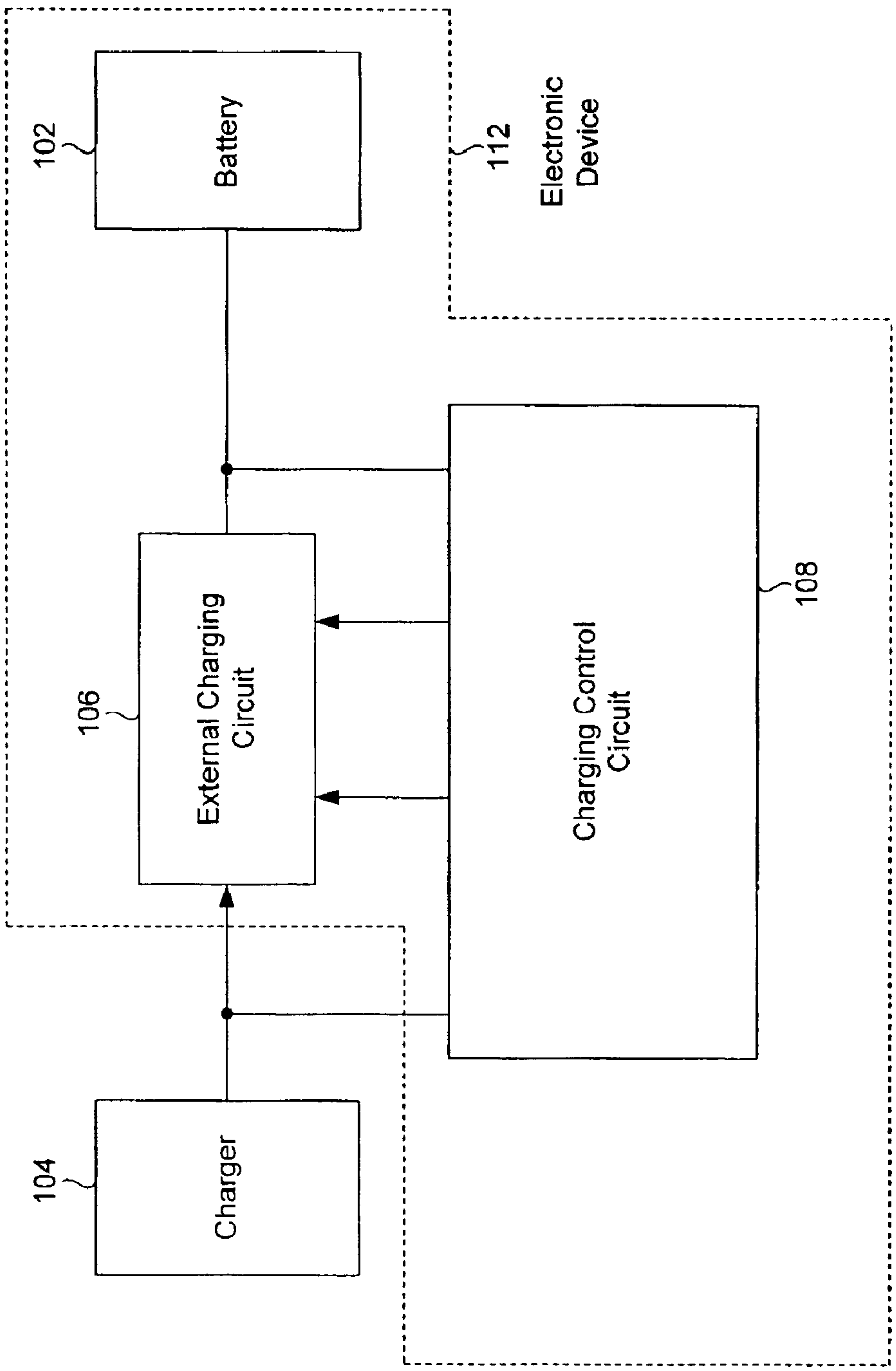
FIG. 1 illustrates an example environment in which the present invention can be used.

FIG. 1 illustrates an example environment 100 in which the present invention can be used. An electronic device 112, such as a cellular phone, personal digital assistant (PDA), or laptop computer, has a battery 102, an external charging circuit 106, and a charging control circuit 108. Battery 102 discharges when electronic device 112 is used. When battery 102 is discharged to a low voltage level, battery 102 is coupled to a charger 104 for charging. Charging control circuit 108 controls the charging sequence to ensure that battery 102 is charged under safe conditions. External charging circuit 106 switches between a slow charging mode and a fast charging mode under control of charging control circuit 108 until battery 102 is fully charged.

Battery Charging Control System

Figure 2:
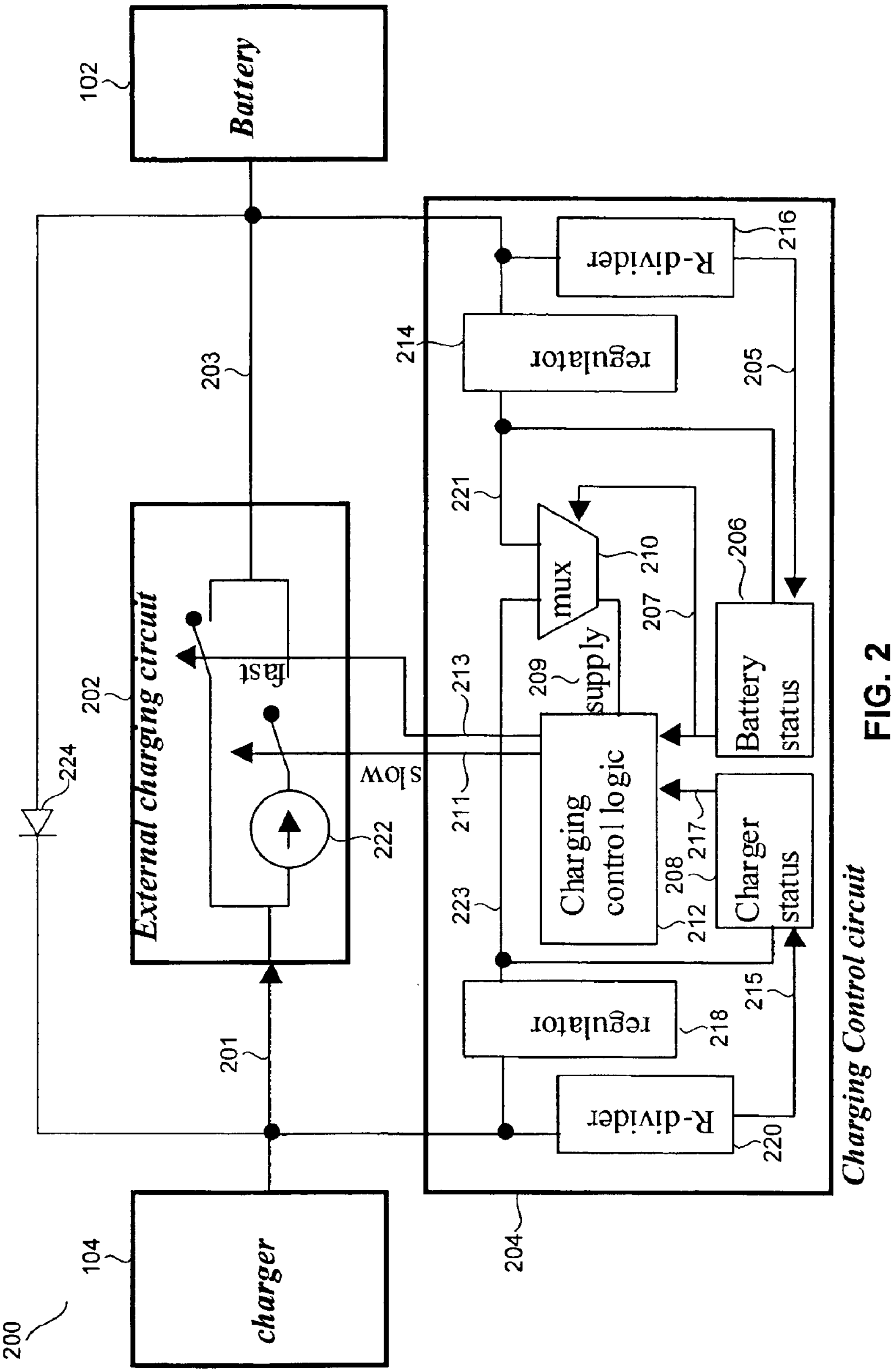
FIG. 2 illustrates a block diagram of a non-CMOS battery charging control system.

In order to describe preferred embodiments of the present invention, it is helpful to contrast the present invention with other approaches. For example, FIG. 2 illustrates a block diagram of a non-CMOS battery charging control system 200. System 200 includes charger 104, an external charging circuit 202, battery 102, and a charging control circuit 204. Charging control circuit 204 receives a battery voltage 203 from battery 102, and a charger voltage 201 from charger 104. A battery voltage divider 216 supplies a reduced battery voltage 205 to a battery status monitor 206, and a battery voltage regulator 214 supplies a regulated battery voltage 221 to an input of a power mulitplexer 210. A charger voltage divider 220 supplies a reduced charger voltage 215 to a charger status monitor 208, and a charger voltage regulator 218 supplies a regulated charger voltage 223 to an input of power multiplexer 210.

Battery status monitor 206 determines whether reduced battery voltage 205 is above or below a battery threshold voltage, and generates a battery status signal 207, which is received by power multiplexer 210 and a charging control logic 212. In an embodiment, the battery threshold voltage is approximately 2.7 V. Power multiplexer 210 selects one of regulated battery voltage 221 and regulated charger voltage 223 to supply charging control logic 212. Power multiplexer 210 couples a charging control logic power supply 209 to regulated battery voltage 221 when battery voltage 203 exceeds the battery threshold voltage. Power mulitplexer 210 couples charging control logic power supply 209 to regulated charger voltage 223 when battery voltage 203 is below the battery threshold voltage.

Charger status monitor 208 determines whether charger 104 is present and capable of charging battery 102, and generates a charger status signal 217, which is received by charging control logic 212. Charging control logic 212 generates an active high slow charging mode control signal 211 when battery voltage 203 is below the threshold voltage. Slow charging mode control signal 211 activates a slow charging circuit 222, which generates a slow charging current to safely charge battery 102 until battery voltage 203 exceeds the threshold voltage. When battery voltage 203 exceeds the threshold voltage, charging control logic 212 generates an active high fast charging mode control signal 213. Fast charging mode control signal 213 activates the fast charging mode of charger 104 until battery 102 is charged. Non-CMOS battery charging control system 200 ensures charger 104 safely charges battery 102 by taking power from charger 104 instead of from battery 102 when battery voltage 203 is below the battery threshold voltage.

Battery Charging Control System Using Low-Voltage CMOS Technology

A problem with battery charging control system 200 is charging control circuit 204 cannot be implemented with low-voltage CMOS technology. For example, low-voltage CMOS devices in charger voltage regulator 218 could be exposed to charger voltage 201. Charger voltage 201 could be as high as 13 V, which exceeds the breakdown tolerance of low-voltage CMOS devices.

Figure 3:
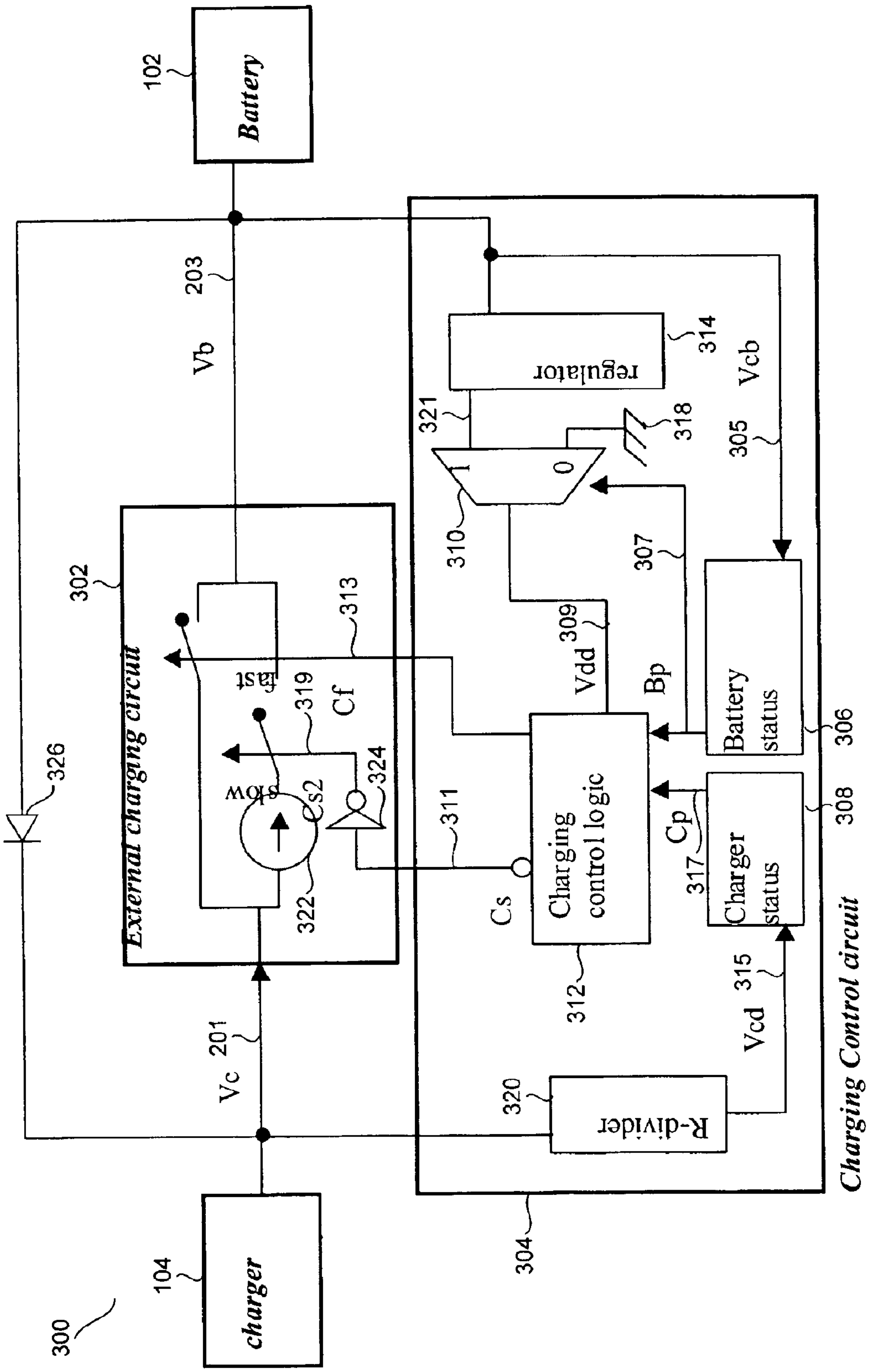
FIG. 3 illustrates a block diagram of a battery charging control system that is compatible with low-voltage CMOS technology, in accordance with an embodiment of the present invention.

FIG. 3 illustrates a block diagram of a battery charging control system 300, which is compatible with low-voltage CMOS technology, in accordance with an embodiment of the present invention. In particular, battery charging control system 300 includes charger 104, an external charging circuit 302, battery 102, and a charging control circuit 304. Charging control circuit 304 receives battery voltage (Vb) 203 from battery 102 and charger voltage (Vc) 201 from charger 104. A battery voltage regulator 314 and a battery status monitor 306 receive a battery voltage (Vcb) 305. Battery voltage regulator 314 supplies a regulated battery voltage 321 to an input of a power multiplexer 310. Another input of power multiplexer 310 is coupled to a ground 318.

Battery status monitor 306 determines whether battery voltage (Vcb) 305 is above or below a battery threshold voltage, and generates a battery status signal (Bp) 307, which is received by power multiplexer 310 and by a charging control logic 312. In an embodiment of the present invention, the battery threshold voltage is approximately 2.7 V. Power multiplexer 310 selects one of regulated battery voltage 321 and ground 318 to supply charging control logic 312. Power multiplexer 310 couples output (Vdd) 309 to regulated battery voltage 321 when battery voltage (Vcb) 305 is above the threshold voltage. Power mulitplexer 310 couples output (Vdd) 309 to ground 318 when battery voltage (Vcb) 305 is below the threshold voltage. Charger status monitor 308 receives a reduced charger voltage (Vcd) 315 from a charger voltage divider 320, and determines whether charger 104 is present and capable of charging battery 102. Charger status monitor 308 generates a charger status signal (Cp) 317, which is received by charging control logic 312.

When battery voltage (Vcb) 305 is below the threshold voltage, battery status signal (Bp) 307 is low, output (Vdd) 309 is grounded, and charging control logic 312 generates an active low slow charging mode control signal (Cs) 311. In this mode, charging control circuit 304 powers down. An inverter 324 inverts slow charging mode control signal (Cs)

311 to produce inverted slow charging mode control signal (Cs2) 319. In turn, inverted slow charging mode control signal (Cs2) 319 activates a slow charging circuit 322, which generates a slow charging current to safely charge battery 102 until battery voltage (Vcb) 305 exceeds the threshold voltage.

When battery voltage (Vcb) 305 exceeds the threshold voltage, battery status signal (Bp) 307 is active high and output (Vdd) 309 is coupled to regulated battery voltage 321. In this mode, charging control circuit 304 powers up and generates an active high fast charging mode control signal (Cf) 313. Fast charging mode control signal (Cf) 313 activates a fast charging mode of charger 104 until battery 102 is fully charged.

Battery charging control system 300 overcomes the limitations of battery charging control system 200 because charging control logic 312 is isolated from charger voltage 201, which typically exceeds the breakdown tolerance of low-voltage CMOS devices. Yet battery charging control circuit 304 is capable of activating slow charging circuit 322, without receiving power from charger 104, to slowly charge battery 102 when battery voltage (Vcb) 305 is below the threshold voltage. Therefore, charging control logic 312 may be safely implemented with low-voltage CMOS devices.

Battery Charging Control System Capable of Reverse Power Mode

Supporting a reverse power mode is a desired feature of a battery charging control system. For example, battery charging control system 200, shown in FIG. 2, supports a reverse power mode. A diode 224 is coupled between charger 104 and battery 102. In an embodiment, diode 224 is a Schottky diode. When battery voltage 203 exceeds charger voltage 201, diode 224 conducts current in the reverse direction. In this mode, battery 102 supplies power to the charger line 201 and is capable of providing power to other devices. In the example of FIG. 1, in the reverse power mode, battery 102 of electronic device 112 could be used to provide power to another electronic device.

A potential problem with battery charging control system 200, shown in FIG. 2, is a leakage current that flows in the reverse power mode on the path between battery 102 and charger 104 and into charger voltage regulator 218. Leakage current is detrimental to charging control circuit 204.

Battery Charging Control System that Suppresses Leakage Current

Figure 4:
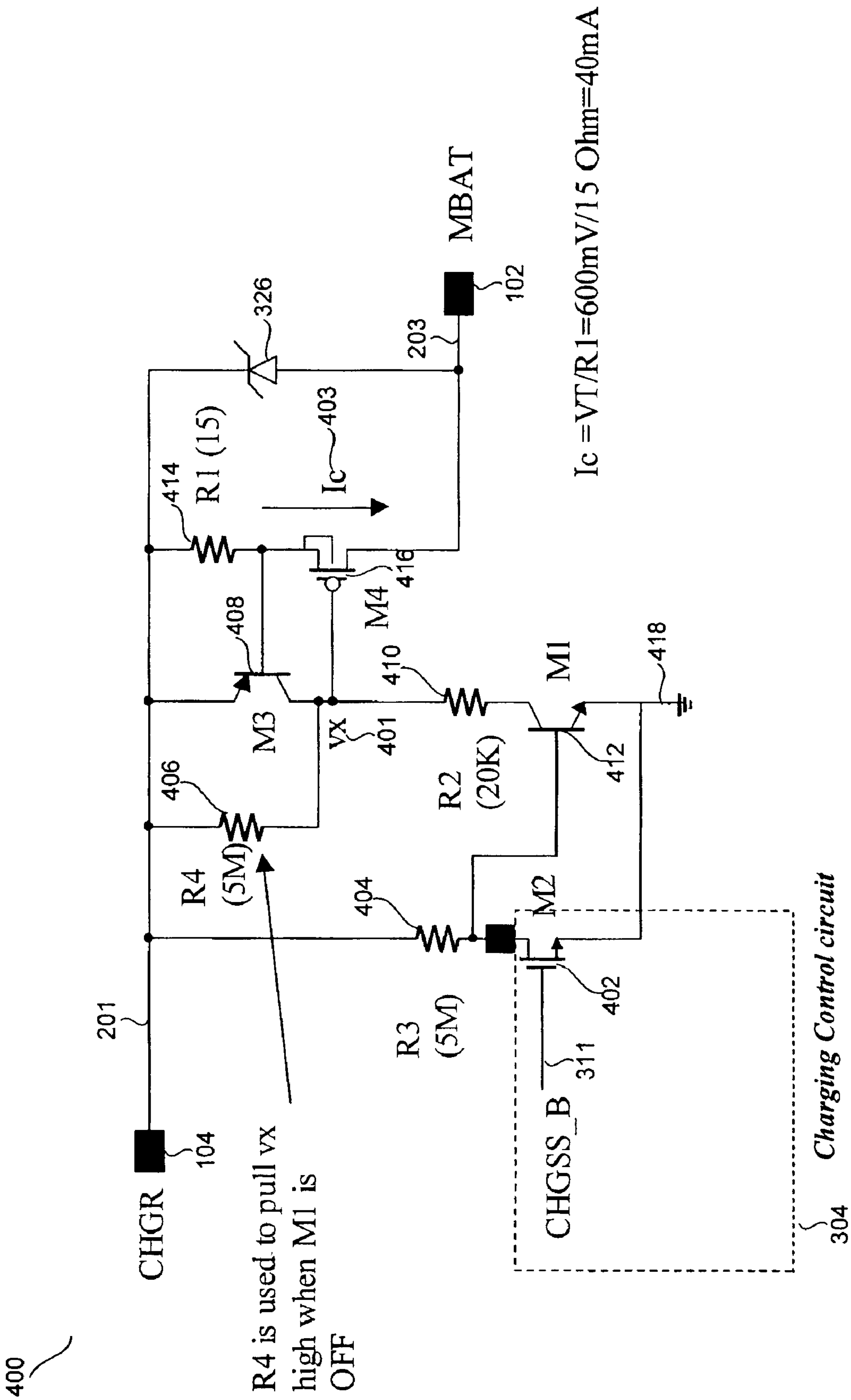
FIG. 4 illustrates a circuit diagram of a slow charging circuit, in accordance with an embodiment of the present invention, which supports a reverse power mode and suppresses leakage current.

FIG. 4 illustrates a circuit diagram of a slow charging circuit 400, in accordance with an embodiment of the present invention, which generates a slow charging current (Ic) 403. Slow charging circuit 400 supports a reverse power mode and substantially prevents leakage current. Slow charging circuit 400 represents current source 322 in FIG. 3.

In the example of FIG. 4, in the slow charging mode, battery voltage 203 is below the battery threshold voltage, charger 104 is present and turned on, and slow charging mode control signal (CHGSS_B) 311 is active low. A resistor (R3) 404 coupled to the drain of a MOS device (M2) 402 invert slow charging mode control signal (CHGSS_B) 311. MOS device (M2) 402 is turned off and a first bipolar junction transistor (M1) 412 is turned on and pulled high through a resistor (R2) 410. A second bipolar transistor (M3) 408 is turned on, producing a voltage drop across a resistor (R1) 414 and generating slow charging current (Ic) 403. In an embodiment of the present invention, the voltage drop is approximately 600 mV and slow charging current (Ic) 403 is approximately 40 mA. A node (vx) 401 is pulled low and a PMOS device (M4) 416 is turned on and passes slow charging current (Ic) 403. Diode 326 is turned off.

In the reverse power mode, charger 104 is not coupled to slow charging circuit 400. Diode 326 is turned on and main battery 102 supplies power to the charger line 201. In an embodiment of the present invention, diode 326 is a Schottky diode. In the reverse power mode, slow charging circuit 400 ensures no leakage current flows into charging control circuit 304, whether inverted slow charging mode control signal (CHGSS_B) 311 is high (when main battery voltage 203 is below threshold) or low (when main battery voltage 203 exceeds threshold).

Method for Controlling the Charging of a Battery Using CMOS Technology

Figure 5:
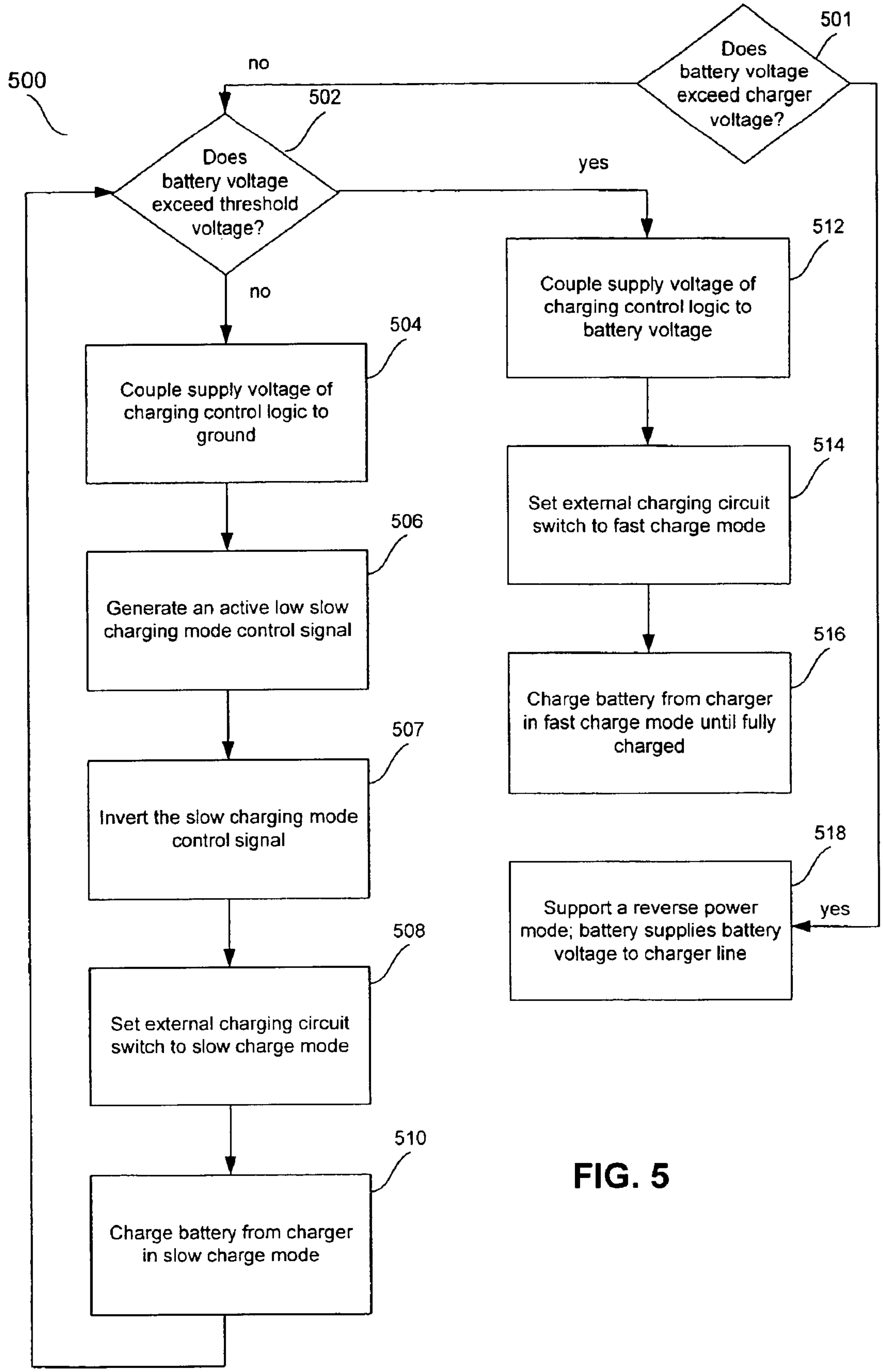
FIG. 5 is a process flowchart for controlling the charging of a battery, according to an embodiment of the present invention.

FIG. 5 is a process flowchart 500 for controlling the charging of a battery, according to an embodiment of the present invention. If a battery voltage exceeds a charger voltage in step 501, then the battery supplies the battery voltage to the charger line in a reverse power mode in step 518. If the battery voltage does not exceed the charger voltage in step 501, then in step 502, a monitor determines if the battery voltage exceeds a battery threshold voltage. If the battery voltage is below the battery threshold voltage, a charging control logic power supply line is coupled to ground in step 504. In an embodiment of the present invention, the charging control logic is implemented with relatively low-voltage CMOS devices. The charging control logic generates an active low slow charging mode control signal in step 506. In step 507, an inverter inverts the active low slow charging mode control signal, which causes the external charging circuit to switch to a slow charging mode in step 508. In step 510, the charger charges the battery in the slow charging mode and the process resumes monitoring in step 502.

When the battery voltage exceeds the battery threshold voltage in step 502, the charging control logic power supply line is coupled to the battery in step 512. In step 514, the charging control logic generates an active high fast charging mode control signal, which causes the external charging circuit to switch to a fast charging mode. In step 516, the charger charges the battery in the fast charging mode until the battery is fully charged. For example, a Li-Ion battery is charged to about 4.2 V.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for controlling the charging of a battery, comprising:

monitoring a battery voltage;

coupling a supply voltage of a charging control logic to a ground, generating an active low first control signal, inverting said active low first control signal, and charging said battery at a first rate in response to receiving said inverted first control signal, when said battery voltage is below a threshold voltage; and coupling said supply voltage of said charging control logic to said battery voltage, generating an active high second control signal, and charging said battery at a second rate in response to receiving said active high second control signal, when said battery voltage exceeds said threshold voltage;

wherein said first rate is slower than said second rate.

2. The method according to claim 1, wherein said charging said battery is performed with a charger, the method further comprising monitoring a status of said charger.

3. The method according to claim 1, further comprising supplying said battery voltage to a charger line when said battery voltage exceeds a charger voltage.

4. The method according to claim 3, further comprising suppressing a leakage current.

5. The method according to claim 1, wherein said coupling said supply voltage of said charging control logic to said battery voltage further comprises regulating said battery voltage.

6. A battery charging control apparatus, comprising:

a charger having a first charging mode and a second charging mode, wherein said first charging mode is slower than said second charging mode;

an external charging circuit coupled between said charger and a battery;

a charging control circuit coupled between said charger and said battery; and an inverter coupled between said charging control circuit and said external charging circuit;

wherein said charging control circuit includes:

a battery status monitor coupled to said battery, said battery status monitor generating a battery status signal according to a battery voltage, a charging control logic coupled to receive said battery status signal, said charging control logic supplying a first control signal and a second control signal to said external charging circuit, and a power multiplexer coupled to receive said battery status signal, said power multiplexer having a first input coupled to said battery and a second input coupled to a ground, wherein said power multiplexer supplies a battery voltage or said ground to said charging control logic according to said battery status signal;

wherein said first control signal is active low when said battery voltage is below a threshold voltage, and wherein said inverter inverts said first control signal to activate said first charging mode when said battery voltage is below said threshold voltage.

7. The battery charging control apparatus according to claim 6, wherein said charging control circuit includes one or more low-voltage CMOS devices.

8. The battery charging control apparatus according to claim 6, further comprising a diode coupled between said charger and said battery, wherein said diode supports a reverse power mode.

9. The battery charging control apparatus according to claim 8, wherein said diode is a Schottky diode.

10. The battery charging control apparatus according to claim 8, wherein said external charging circuit suppresses a leakage current during said reverse power mode.

11. The battery charging control apparatus according to claim 10, wherein said external charging circuit includes a PMOS device that suppresses said leakage current.

12. The battery charging control apparatus according to claim 6, wherein said charging control circuit further comprises a voltage regulator coupled between said battery and said first input of said power multiplexer.

13. The battery charging control apparatus according to claim 6, wherein said inverter includes a resistor coupled to a gate of a MOS device.

14. The battery charging control apparatus of claim 6, further comprising a charger status monitor coupled to said charger, said charger status monitor supplying a charger status signal to said charging control logic.

15. The battery charging control apparatus according to claim 14, further comprising a voltage divider coupled between said charger and said charger status monitor.

16. A battery charging control system, comprising a first charging means for charging a battery;

a second charging means for charging said battery, wherein said first charging means charges said battery slower than said second charging means;

external switching means for switching between said first charging means and said second charging means;

battery monitoring means for monitoring a voltage of said battery, said battery monitoring means generating a battery status signal;

controlling means for controlling said external switching means, said controlling means generating a first control signal and a second control signal, wherein said first control signal is active low when said battery voltage is below a threshold voltage;

means for inverting said first control signal; and voltage selection means for supplying a voltage to said controlling means according to said battery status signal, wherein said voltage selection means prevents said charging means from directly supplying a voltage to said controlling means.

17. The battery charging control system according to claim 16, further comprising reverse power mode means, wherein said battery supplies said battery voltage to a charger line when said battery voltage exceeds a charger voltage.

18. The battery charging control system according to claim 17, wherein said first charging means further comprises means for suppressing a leakage current from flowing into said controlling means.

19. The battery charging control system according to claim 16, further comprising means for regulating said battery voltage.

20. The battery charging control system according to claim 16, further comprising means for monitoring a status of said charging means.

* * * * *